Patented Oct. 31, 1950

2,528,350

UNITED STATES PATENT OFFICE 2,528,350

TWO-STEP DIGESTION OF HARDWOODS

Eduard Farber, Washington, D. C., assignor, by mesne assignments, to Hardwood By-Products, Inc., a corporation of Delaware No Drawing. Application June 5, 1947, Serial No. 752,829

4 Claims. (Cl. 92—13)

The present process is primarily concerned with the production of so-called hardwood pulps. The term hardwood is generally used to comprise those kinds of woods which have deciduous leaves. In connection with the present method, the chemically important fact is that hardwoods are characterized by a high content of hemicelluloses. The invention is concerned only with the kinds of wood which are rich in such hemicelluloses, i. e., wood characterized by a hemicellulose content of at least 18%. Among species of this kind are all the common hardwoods, for example, poplar, oak, maple, gum, walnut, etc. Wood species in which the hemicellulose content is at least 18% are less stable against chemical actions than the woods with lower hemicellulose content, especially the so-called soft woods, in which the hemicelluloses range between 6% and 10%. Mesquite is about at the border line of those woods which can be treated according to the present invention. According to its hemicellulose content, mesquite is below the average of normal hardwoods. In correlation with this fact it has been found that this wood cannot be treated as successfully as woods with higher hemicellulose contents.

The plup which it is the purpose of the present method to produce is characterized in that it consists of fiberized wood from which only a relatively small amount of non-cellulosic material has been removed by a mild chemical and extractive reaction. In this respect, therefore, the object of the present invention is not to produce pure or nearly pure cellulose, but to convert as much as possible of the wood substance into material that lends itself to being fiberized readily. The pulp of this invention contains rather large amounts of the original lignin and hemicellulose materials so that the yields per hundred parts of wood are of the order of 80 to 90 parts of this type of pulp.

Some attempts have been made in the past to produce wood pulp from so-called hardwoods. However, the approach has usually been through processes analogous to the methods developed for producing pulp from soft woods by chemical treatment with high temperatures and high pressures, with the aim of manufacturing material of high cellulose content and purity. It is the object of the present invention to utilize the particular chemical properties of the hardwood substance to respond to mild chemical action and to yield fibers, which, although they still contain much lignin, readily form sheets or boards of good technical properties.

Inherently in the production of hardwood products considerable waste occurs in the form of shavings, veneer chips, wood chips, slabs, edgings, and the like. Hardwood is recognized as a valuable structural material. In its broader aspects, the present invention contemplates the recovery and transformation of the hardwood waste products into a form permitting of their employment as structural material with as little modification of the inherently possessed properties of hardwood as can be brought about. The hardwood pulp of the present invention comprises in large measure the hardwood starting material modified primarily as to form with a separation through mild chemical extraction of only a sufficient amount of bonding agents of the natural wood to permit of the change in form of the wood waste and the production of sheets and boards of hardwood pulp.

Coming to the details of the process of the present invention, the hardwood waste materials are often found in a form ready for treatment. In other instances, the hardwood waste materials will be reduced to small particle size, but at least large enough to contain original fiber length and thickness of the wood fiber.

In this form, the wood particles are preferably subjected to an initial washing and extraction with water at ordinary or slightly elevated temperature to remove water soluble materials and to prewet the wood charge for better reception of the subsequent chemical solution.

The water containing such extractives may then be separated from the wood and substituted by a dilute solution of sodium bisulfite. For 100 parts of wood waste, between 2 and 10 parts of sodium bisulfite may be used dissolved in 400 to 500 parts of water. This dilute sodium bisulfite treatment may be carried out at room temperature or, generally speaking, at temperatures within the range of 15° C. to 30° C. for periods of one to two hours. Additional organic material is thereby dissolved out of the wood with only small consumption of the free sulfite. The dark sulfite solution is then removed and in case a relatively large amount of sulfite has been used, the solution can be reused for treating further amounts of wood.

After the wood has been extracted with water and with the sodium bisulfite solution, it is then subjected to a mild alkaline digestion in which, for instance, solutions containing 1% to 4% of free sodium hydroxide are mixed with the pretreated wood substance preferably at elevated temperatures usually in the neighborhood of 70° C. to 80° C., but well below 100° C. The amount of free sodium hydroxide consumed in this digestion is usually of the order of 3 to 5 parts per 100 parts of wood substance. For 100 parts of wood between 300 and 500 parts of alkali solution may be used. It has been found that the extractives separated by the bisulfite solution contain materials that are precipitated by free alkali; therefore, it is desirable to separate the bisulfite treatment from the alkaline digestion wherever the whiteness of the end product is of importance. In certain cases, where whiteness of the end product is not essential, the two treatments may be combined. Wood is then digested with a solution of sodium hydroxide containing sodium bisulfite in approximately the proportions mentioned. In this alkaline solution, the sulfite is susceptible to secondary oxidation in contact with air. Where the cost of chemicals is a decisive factor or an especially white pulp is required it is preferable to use the treatment in separate steps; whereas, when the cost of handling is a primary consideration and a dark pulp may be tolerated, it may be more advantageous to apply the treatment in a single stage with a combined chemical solution.

The following examples are illustrative of the invention:

*Example I.*—Poplar veneer chips having a 30% moisture content were used in this example. 3 kilograms, on a dry weight basis, of these chips were defibered in a hammer mill. A treating solution was prepared composed of 45 kilograms of water (a ratio of water to wood of 15 to 1), 900 grams of sodium hydroxide (a ratio of 300 grams NaOH to 1 kilogram of wood), 180 grams of anhydrous sodium bisulfite (a ratio of 60 grams $Na_2S_2O_5$ to 1 kilogram of wood). The solution was heated to 60° C. and was added to the defibered wood. The charge was maintained at 50° C. for 2 hours with continued stirring.

Samples of the liquor were taken at half hour intervals. The sample taken at the end of the first half hour had a specific gravity of 1.027 and contained 16 grams sodium hydroxide per kilogram of the liquor. A sample at the end of one hour had a specific gravity of 1.029 and contained 15.6 grams of sodium hydroxide to a kilogram of liquor. The one and one-half hour sample had a specific gravity of 1.028 and had a content of 15.6 grams of sodium hydroxide per kilogram of liquor. The wet wood recovered from the solution by filtration represented 11.3 kilograms consisting of approximately 2.7 kilograms of residual wood substance on a dry weight basis and 8.6 kilograms of the reaction liquor which, according to calculations should have contained approximately 134 grams of sodium hydroxide.

The 11.3 kilograms of wet chips were placed in a beater and 33 kilograms of water were added to give a concentration of pulp material in water of about 7.0%, yielding an appropriate consistency. The residual sodium hydroxide, when checked in the beater charge was found to be somewhat higher than calculated, i. e., about 146 grams for free alkalinity. The beater time employed was one hour. Following the beating, the wet pulp was drained on a filter and given repeated water washings. In the first effluent 87 grams of sodium hydroxide were removed, in the first water washing 45 grams of sodium hydroxide, and in the second water washing 13 grams of sodium hydroxide were removed, making a total of 146 grams. Following the water washing, the wet pulp was acidified with 34 cc. of concentrated sulfuric acid greatly diluted with water, and again water washed.

Final determinations indicated that about 56 grams of sodium hydroxide for each kilogram of the original dry weight of wood employed were no longer present as free alkali after the reactions had taken place.

The recovered pulp was of good grade and represented approximately 90% of the wood treated.

*Example II.*—In this case, 4 kilograms on a dry weight basis of oak wood chips containing some bark were subjected to treatment. The treating solution was composed of 22.5 kilograms of water, 1350 grams of sodium hydroxide and 450 grams of $Na_2S_2O_5$. The solution was initially raised to 80° C., and the reaction conducted for a period of 2 hours at temperatures approximating 57° C. to 60° C. The wet chips were separated from the solution by filtration and thereafter pressed. 9.18 kilograms of wet wood material were removed from the solution. In this experiment, approximately 115 grams of sodium hydroxide were reacted for each kilogram of wood treated, considered on a dry weight basis. The 9.18 kilograms of wet wood material were placed in a beater with 46 kilograms of water and subjected to a beating action for 25 minutes. The material was then water washed and acidified with 25 cc. of concentrated sulfuric acid diluted in one liter of water, thereafter washed once and pressed. The wet pulp represented 11.1 kilograms, which constitutes 3.11 kilograms computed on a dry basis, representing about 76% of the wood treated. The bark particles showed up as dark specks in the pulp.

*Example III.*—In this example 4.5 kilograms of hammer milled oak chips on a dry weight basis were treated. The treating solution was comprised of 22.5 kilograms of water containing 540 grams of sodium hydroxide and 180 grams of $Na_2S_2O_5$. The reaction time employed was one hour and the temperature approximately 55° C. Final determinations indicate that about 62.7 grams of sodium hydroxide were reacted for each kilogram of wood chips employed. The wet wood material separated from the treating solution by filtration was pressed and mixed with water to the proper consistency for beating and subjected to a beating operation for 25 minutes. The wet pulp was drained and washed washed three times with water. It was then acidified with 20 cc. of concentrated sulfuric acid diluted with water. The pulp recovered represented 3.4 kilograms on a dry weight basis or approximately 75.5% of the wood treated. Some loss of fines occurred in this example through a screening operation. Then a comparative freeness test was run on the pulp product of this example. 10 grams on a dry weight basis was prepared in a 500 cc. slurry and filtered into graduate drainage. 99 cc. passed the filter in 5 minutes and 131 cc. had passed the filter in 10 minutes, the filtering being very slow during the latter 5 minutes.

*Example IV.*—In this example, 12 kilograms on a dry weight basis of hammer milled oak chips were treated. The treating solution was comprised of 60 kilograms of water containing 720 grams of sodium hydroxide and 120 grams of $Na_2S_2O_5$. The reaction time was one hour and the temperature of reaction approximately 60° C. The wet wood separated from the reaction represented 28.9 kilograms. A final determination indicated that 46.5 grams of sodium hydroxide were reacted for each kilogram of wood treated. The wet wood material was mixed with water and subjected to a beating operation. The beater time employed was 1¼ hours. The pulp produced represented 10.5 kilograms on the dry basis or approximately 87.5% of the wood treated. In the comparative test, 152 cc. of filtrate passed the filter in 5 minutes.

*Example V.*—In this example, 20 kilograms on a dry weight basis of oak chips were subjected to treatment. The treating solution was comprised of 120 kilograms of water containing 1200 grams of sodium hydroxide and 200 grams of $Na_2S_2O_5$. The reaction time was 2 hours and the temperature was maintained between 70° C. and 75° C. 49.3 kilograms of wet fibers were separated from the treating solution by filtration. The wet fibers were mixed with water and subjected to a beater treatment for one hour. The pulp was water washed, acidified and formed into sheets. The pulp represented 16.9 kilograms on a dry basis or a yield of approximately 84.5%. The comparative test showed a drainage of 148 cc. in 5 minutes.

*Example VI.*—In this example, 8 kilograms on a dry weight basis of hardwood chips composed of oak, maple and walnut were treated. The treating solution comprised 48 kilograms of water containing 1200 grams of sodium hydroxide and 120 grams of $Na_2S_2O_5$. The reaction time was 1½ hours and the temperature was maintained between 61° C. and 72° C. 21 kilograms of wet material was separated from the solution at the end of the reaction time. Water was added to this material and it was subjected to beater treatment for 45 minutes. Final determinations indicate that 78 grams of sodium hydroxide were reacted for each kilogram of wood treated. 7.2 kilograms of a good grade of pulp was recovered, representing 90% on the basis of the wood treated. The comparative test disclosed a drainage of 139 cc. of filtrate in 5 minutes.

*Example VII.*—In this example, 8 kilograms on a dry weight basis of hardwood chips containing red gum, poplar and beech were treated. The treating solution comprised 50 kilograms of water containing 1600 grams of sodium hydroxide, and 120 grams of $Na_2S_2O_5$. The reaction time was 1½ hours and the temperature was maintained between 59° C. and 70° C. 21 kilograms of wet wood material were separated from the solution at the end of the reaction period. This material was diluted with water and subjected to a beater treatment for approximately one hour. A final check indicated than 97 grams of sodium hydroxide were reacted for each kilogram of wood material treated.

6.62 kilograms of a good grade of pulp was produced representing approximately 82% on the basis of the dry wood treated. The pulp on a comparative test showed a drainage of 251 cc. of filtrate in 5 minutes.

*Example VIII.*—Oak wood in the form of hogged fuel was reduced to roughly uniform size comprising mostly chips of 1 to 2 mm. in thickness and 1 to 2 cm. long by sending it through a hammermill. The chips were then extracted with warm water, producing a dark colored solution of extractives most of which was separated by draining from the wet wood.

Amounts of this wet wood corresponding to 1 kilogram of original dry substance were then treated with 4 liters of a solution of sodium bisulfite. In a series of comparable runs the amount of sodium bisulfite was varied between 20 and 100 grams. The pH of the digesting mass containing 20 grams of bisulfite was 4.7; that containing 40 grams was 4.66; that containing 80 grams was 4.5; and that containing 100 grams was 4.4. After one hour at room temperature of about 25° C. about ¾ of the added solution was removed by decantation. The consumption of sodium sulfite determined by comparison of the original amount with that found in the solution after digestion was about 1 gram with the lowest amount of sulfite and increased to approximately 8 grams where the largest amount of sulfite had been used. The remaining free bisulfite could be utilized to treat additional amounts of wood.

Each kilogram of the residual wood was then mixed with 1 liter of water containing 50 grams of sodium hydroxide. The temperature was raised to about 70° C. After one hour at this temperature an amount of dark brown, alkaline liquor was drained off and digested wood chips were introduced into a beater. Enough water was added to produce a consistency of about 4%. The separation of wood chips into free fibers was complete after about 45 minutes in this type of beater. Filtering and washing produced a nearly white pulp that formed sheets readily on the usual type of machine.

*Example IX.*—2 kilograms on a dry weight basis of oak waste chips, having a moisture content of about 11%, were treated with a solution comprising 10 liters of water containing 100 grams of sodium bisulfite. The temperature of the solution was maintained at approximately 25° C. and the material treated for about 1 hour. Following this treatment, the free liquor was drained off and the chips pressed to remove excess liquid. The wet chips were then placed in 8 liters of water containing 160 grams of sodium hydroxide and subjected to treatment for 2 hours at a temperature of approximately 70° C. The liquor was then separated from the digested wood and the latter was introduced into a beater with about 80 liters of water and, following the beating treatment, the water was separated by filtration. The pH was adjusted to about 5 by an acid wash and a nearly white pulp was recovered in a yield representing about 80% of the dry wood treated. Accordingly, when lighter pulps are required, it will be desirable to separate the sulfite treatment and the alkali treatment.

In all procedures, some advantage is obtained by initially washing the wood with water to remove water soluble materials and facilitate the wetting and penetration of the wood by the chemical solutions employed in the extraction and digestion steps.

*Example X.*—In this semi-commercial operation, 4 tons of hardwood were employed. The wood consisted of a mixture of oak, maple, sycamore and walnut, partly in the form of so-called hogged fuel and partly as veneer chips. The hogged fuel contained a substantial amount of bark. The veneer chips were bark free. The charge consisted of 3 tons of hogged fuel and 1 ton of the veneer chips.

All of the charging material was run through a hammer mill, moisture determinations were made, and the charge of 4 tons computed on a dry weight basis. The material from the hammer mill, which occupied a space of 620 cubic feet, was conveyed to a concrete vat equipped with heating coils, which had been previously charged with a treating solution comprised of 5300 gallons (44,000 pounds) of water containing 500 pounds of sodium hydroxide and 75 pounds of $Na_2S_2O_5$. The treating solution was maintained in circulation and heated to 65° C. during a 2 hour period. After the wood was added to this treating material, it was allowed to stand for 20 hours with just sufficient agitation to insure good contact. After the 20-hour period, the solution was drained off and the wet wood material transferred for beating. The beater would accommodate a charge of only about 750 pounds and the wet wood material was mixed with water to give an appropriate consistency for beating. A beater time of 1 hour, 45 minutes was employed. After being screened, the pulp was run to a cylinder mold where it was picked up properly and formed a satisfactory sheet.

In all these procedures, chemicals are used in dilute solutions without superatmospheric pressures and the consumption of chemicals is relatively low, for instance, between 0.5 to 1 pound of sulfite and between 3 and 6 pounds of sodium hydroxide per 100 pounds of wood subjected to the treatment.

The method has been applied successfully to many different kinds of hardwoods, especially to waste materials occurring in lumber or veneer cutting operations. Large pieces of waste wood in the form of edgings or hogged fuel are best broken down to appropriate size in a hammer mill. Wastes from the production of veneer usually are in the form of thin slabs which up to now have been useless even as a fuel because of their large surface development and light weight. Such veneer chips can readily be converted into valuable pulp according to the present method.

An additional advantage of carrying out the process in several steps according to the present preferred method resides in a considerable reduction of foaming during agitating or beating. Digested wood chips resulting from the one-step process have a tendency to foam during the beating period. Material prepared by first treating with the bisulfite solution and then digesting with alkali has been found to form very little foam in the beater, even when beating was carried out at alkaline reaction.

Having thus described my invention, what I claim is:

1. A process of preparing for subsequent fiberizing treatment particles of hardwoods having a hemicellulose content of at least 18% which comprises essentially digesting said particles for a period of from about 1 to about 2 hours at a temperature from about 15° C. to about 30° C. with a dilute aqueous solution containing essentially about 0.4% to about 2.5% by weight of an alkali metal sulfite, and then digesting for a period of from about 1 to about 2 hours, said particles at a temperature of from about 70° C. to about 80° C. with an aqueous solution containing essentially from about 1% to about 4% of an alkali metal hydroxide, the entire process being carried out at atmospheric pressure.

2. The process of claim 1 in which the alkali metal sulfite is sodium sulfite and the alkali metal hydroxide is sodium hydroxide.

3. The process of preparing for subsequent fiberizing treatment particles of hardwoods having a hemicellulose content of at least 18% which comprises essentially initially extracting particles with water and then digesting said particles for a period of from about 1 to about 2 hours, at a temperature from about 15° C. to about 30° C. with a dilute aqueous solution containing essentially about 0.4% to about 2.5% by weight of an alkali metal sulfite, and then digesting for a period of from about 1 to about 2 hours, said particles at a temperature of from about 70° C. to about 80° C. with an aqueous solution containing essentially from about 1% to about 4% of an alkali metal hydroxide, the entire process being carried out at atmospheric pressure.

4. The process of claim 3 in which the alkali metal hydroxide is sodium hydroxide and the alkali metal sulfite is sodium sulfite.

EDUARD FARBER.

REFERENCES CITED

The following references are of record in the file of this patent:

UNITED STATES PATENTS

| Number | Name | Date |
|---|---|---|
| Re. 20,217 | Dunbar | Dec. 29, 1936 |
| 223,670 | Ferrell | Jan. 20, 1880 |
| 227,464 | Wilson | May 11, 1880 |
| 1,848,661 | Richter | Mar. 8, 1932 |
| 1,920,496 | Carpenter | Aug. 1, 1933 |
| 1,931,575 | De La Roza | Oct. 24, 1933 |
| 2,038,925 | Dunbar | Apr. 28, 1936 |
| 2,041,745 | Dreyfus | May 26, 1936 |
| 2,065,396 | Richter | Dec. 22, 1936 |
| 2,110,546 | Dreyfus | Mar. 8, 1938 |
| 2,118,074 | Dreyfus | May 24, 1938 |

FOREIGN PATENTS

| Number | Country | Date |
|---|---|---|
| 322,763 | Great Britain | Dec. 2, 1929 |

OTHER REFERENCES

Chemical Abstracts, vol. 36, p. 2140 (1942).

Industrial and Engineering Chemistry, Jan. 1941, p. 82.

Paper Trade Journal, May 23, 1946, pp. 43 and 44.

Report on Third International Conference on Timber Utilization, Paris, 26–28, July 1937, No. 16/17, Special No. 92, p. 95.